June 17, 1930.  H. W. PALM  1,764,851
PARALLEL DRIVE ATTACHMENT FOR LAWN MOWERS
Filed Nov. 26, 1928  2 Sheets-Sheet 1

Inventor
Hugo. W. Palm
By Clarence A. O'Brien
Attorney

June 17, 1930.  H. W. PALM  1,764,851
PARALLEL DRIVE ATTACHMENT FOR LAWN MOWERS
Filed Nov. 26, 1928  2 Sheets-Sheet 2

Inventor

Hugo W. Palm

By *Clarence A. O'Brien*
Attorney

Patented June 17, 1930

1,764,851

UNITED STATES PATENT OFFICE

HUGO WILLIAM PALM, OF PEQUANNOCK, NEW JERSEY

PARALLEL DRIVE ATTACHMENT FOR LAWN MOWERS

Application filed November 26, 1928. Serial No. 322,077.

This invention relates to lawn mowers and has for its principal object to provide a motor drive attachment adapted to be mounted in operative position upon the lawn mower for operating the same.

A still further object is to provide an attachment of this character which may be mounted in operative position upon lawn mowers of the usual type without necessitating any changes or alterations whatever in the construction thereof.

An important object of the invention is to to provide a pivotal mounting for the motor upon the frame of the lawn mower by means of which the drive wheel of the motor may be moved into and out of driving engagement with the wheels of the mower.

A still further object of the invention is to provide an attachment of this character for hand operated mowers and arranging control means adjacent the lawn mower handle for controlling the operative engagement of the motor.

Figure 1:
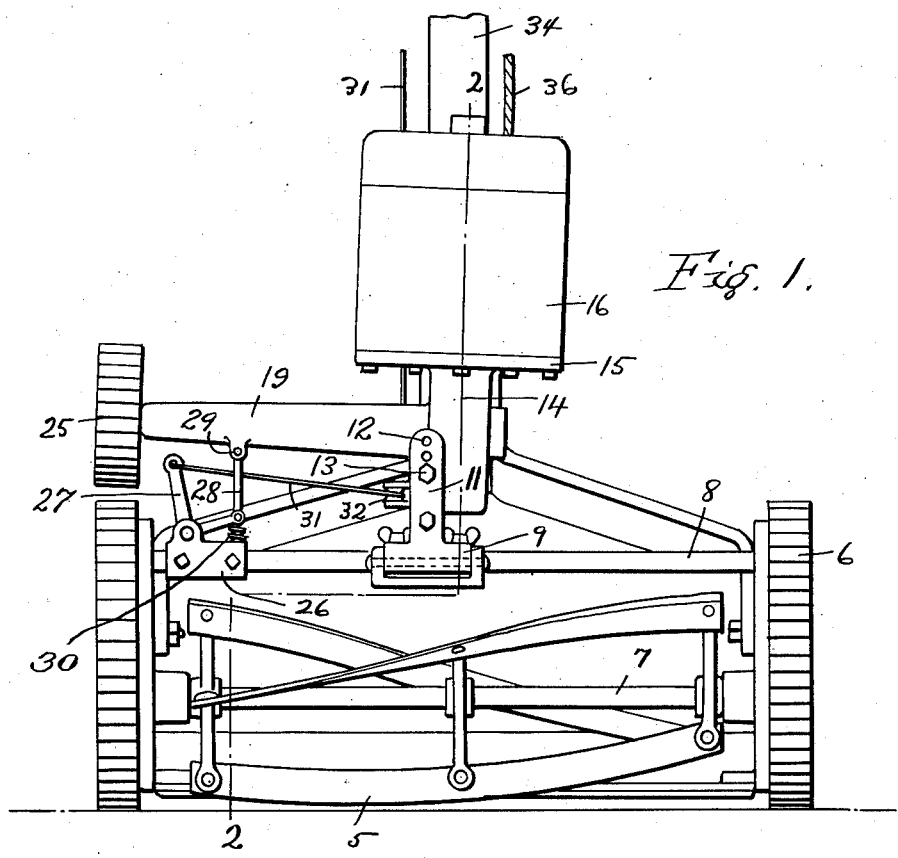
Figure 4:
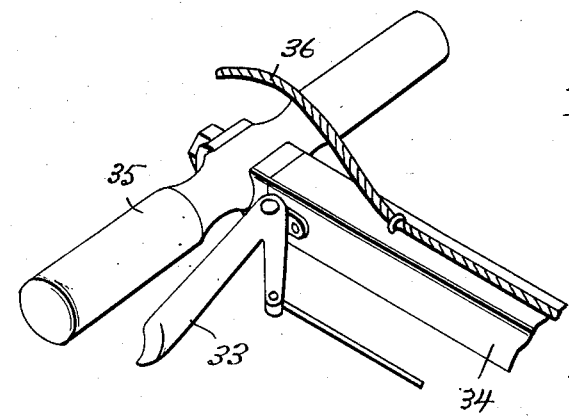
Figure 2:
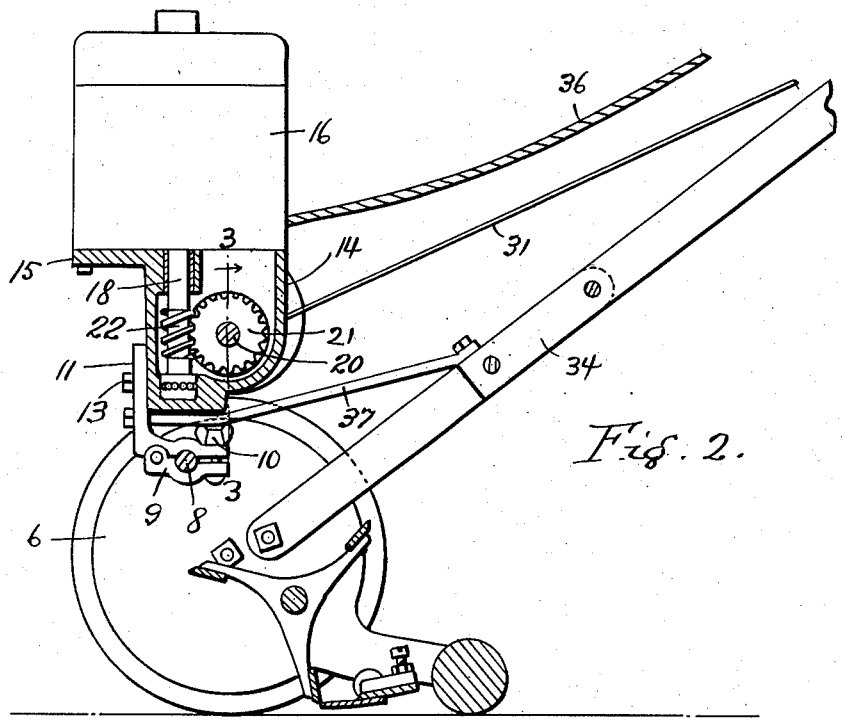
Figure 3:
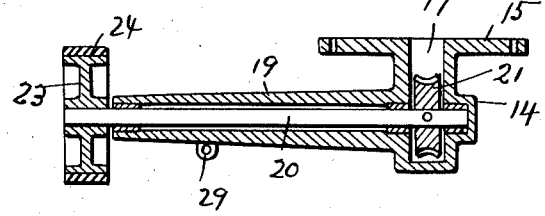

Other objects and advantages reside in the special construction, combination and arrangement of the various elements forming the invention as more fully hereinafter described and claimed, reference being had to the accompanying drawings forming part hereof wherein like numerals refer to like parts through, and in which:

Figure 1 is a front elevational view of a lawn mower showing the motor drive attachment in operative position thereon, Figure 2 is a vertical transverse sectional view taken substantially along a line 2—2 of Figure 1, Figure 3 is a vertical sectional view through the motor support and drive shaft housing and Figure 4 is a fragmentary perspective view of the handle of the motor showing the position of the control means attached thereto.

Referring now to the drawings in detail, wherein for the purpose of illustration I have disclosed a preferred embodiment of the invention, the numeral 5 designates a hand operated lawn mower of conventional construction including the usual ground drive wheels 6 for the blade shaft 7 and which also includes a transversely extending bar 8 generally provided for supporting pinion gears on its ends constituting a part of the drive mechanism of the motor.

The attachment constituting the subject matter of my invention comprises a bar clamping member 9 detachably secured to the bar 8 by bolts and nuts 10, one section of the clamping member having an upwardly extending plate 11 formed thereon. The upper portion of the plate 11 is provided with a series of vertically alined openings 12 for adjustably receiving a bolt 13 whereby to adjustably attach a motor support 14 to said plate.

The motor support 14 comprises a casting having a horizontally disposed plate 15 formed at its upper portion upon which an electric motor 16 of conventional construction is supported and having a central opening 17 through which the shaft 18 of the motor extends.

The casting also includes a laterally extending shaft housing 19 having a drive shaft 20 journalled therein with one end provided with a worm wheel 21 disposed within the casting and arranged for engagement by a worm 22 carried on the lower end of the shaft 18. The opposite end of the shaft 20 provides a mounting for a drive wheel 23 having a rubber rim 24 arranged thereon with its outer surface formed with transverse ribs 25 and adapted for engagement with one of the wheels 6 of the mower.

The bar 8 also provides a mounting for a clamping member 26 which is disposed beneath the free end of the shaft housing 19, said clamping member having a bell crank lever 27 pivotally attached thereto.

One end of the lever 27 is pivotally attached to a link 28, said link being disposed vertically and attached at its upper end to a lug 29 formed on the housing. The lower end of the link 28 is engaged by an expansion spring 30 attached to the clamping member for normally urging the housing 19 upwardly with the wheel 23 out of engagement with the wheel 6.

A cable 31 has one end attached to the other end of said bell crank and extends about a pulley wheel 32 rotatably mounted on the casting and has its opposite end attached to a hand lever 33 pivotally secured to the handle 34 of the lawn mower adjacent the hand grip 35. It will be apparent from the foregoing that upon the operation of the hand lever 33 that the shaft housing 19 will be moved downwardly whereby to bring the drive wheel 23 of the motor into operative engagement with the wheel 6 of the lawn mower.

The bolt 13 providing a pivotal connection between the plate 11 and motor support 14 permits the vertical movement of said shaft housing. An electric extension cord 36 extends longitudinally of the handle 34 whereby to connect the motor 16 with a suitable source of electric power, such as for instance a house circuit. A brace rod 37 extends from the plate 11 to the handle 34 whereby to support the attachment against forward or rearward tilting movement during the operation of the motor.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

A motor drive attachment for lawn mowers comprising a lawn mower clamping member, an attaching plate extending upwardly therefrom, a motor support pivotally carried by said attaching plate, a shaft housing formed on said support and extending laterally of the mower, a drive shaft mounted for rotation in the housing, a drive wheel mounted on the outer end of said shaft and disposed in position for engagement with one of the ground wheels of the mower, said support having a motor secured thereto in operative engagement with said drive shaft, a clamping member secured to the mower adjacent the free end of said shaft, a bell crank lever pivotally attached to said last named clamping member having one end coupled to the shaft housing, spring means carried by said last named clamping member engaging the bell crank lever in a manner to rock the same and raise the shaft housing for yieldably retaining the drive wheel out of driving engagement and means attached to the other end of said bell crank and extending to a remote position on the mower and adapted for actuating said bell crank whereby to move the drive wheel into operating position.

In testimony whereof I affix my signature.

HUGO WILLIAM PALM.